United States Patent [19]

Hanyu et al.

[11] Patent Number: 5,747,557
[45] Date of Patent: May 5, 1998

[54] METHOD OF MANUFACTURING A CASTABLE EPOXY RESIN COMPOSITION COMPRISING ACRYLIC RUBBER PARTICLES PREDISPERSED IN AN ANHYDRIDE HARDENER

[75] Inventors: Koshi Hanyu; Akira Yoshizumi, both of Yokohama, Japan

[73] Assignee: Kabushiki Kaisha Toshiba, Kawasaki, Japan

[21] Appl. No.: 722,339

[22] Filed: Sep. 27, 1996

Related U.S. Application Data

[63] Continuation of Ser. No. 292,764, Aug. 19, 1994, abandoned.

[30] Foreign Application Priority Data

Aug. 20, 1993 [JP] Japan .................... 5-206073
Mar. 15, 1994 [JP] Japan .................... 6-044454

[51] Int. Cl.$^6$ .......................... C08L 63/00; C08L 33/06; C08G 59/42; C08K 3/22
[52] U.S. Cl. .......................... 523/201; 523/427; 523/436; 523/440; 523/443; 523/444; 523/467; 523/457; 525/65; 525/902
[58] Field of Search .................... 523/201, 427, 523/436, 457, 440, 443, 444, 467; 525/902, 65

[56] References Cited

U.S. PATENT DOCUMENTS

| | | | |
|---|---|---|---|
| 4,665,111 | 5/1987 | Hussain | 523/457 |
| 4,778,851 | 10/1988 | Henton | 525/902 |
| 4,916,174 | 4/1990 | Yoshizumi et al. | |
| 5,068,267 | 11/1991 | Uchida et al. | |
| 5,096,762 | 3/1992 | Yoshida | 523/440 |
| 5,236,973 | 8/1993 | Demarmels | 523/201 |
| 5,258,426 | 11/1993 | Uchida | 523/436 |
| 5,332,781 | 7/1994 | Eldin et al. | 525/65 |

FOREIGN PATENT DOCUMENTS

| | | | |
|---|---|---|---|
| 44963 | 3/1986 | Japan | 523/457 |
| 218622 | 9/1986 | Japan | 523/457 |
| 2-288107 | 11/1990 | Japan | |

OTHER PUBLICATIONS

Lee et al., Handbook of Epoxy Resins, McGraw Hill Book Co., pp. 14/4–14/10 (1982 Reissue).
Lee, et al., "Handbook of Epoxy Resins", McGraw-Hill Book Co., New York. pp. 12/2–3 (Reissue 1982).
Kirk–Othmer, "Encyclopedia of Chemical Technology", 3rd ed., vol. 21, John Wiley & Sons, New York, pp. 106–131 (1983).
Makromol. Chem., Macromol. Symp., vol. 41, pp. 179–194, 1991, G. Levita, et al., "Toughness of Epoxies Modified by Performed Acrylic Rubber Particles".

*Primary Examiner*—Donald R. Wilson
*Attorney, Agent, or Firm*—Oblon, Spivak, McClelland, Maier & Neustadt, P.C.

[57] ABSTRACT

A method of manufacturing a castable epoxy resin composition which comprises as components an epoxy resin, an acid anhydride in an amount sufficient for hardening, an inorganic filler, and acrylic rubber particles having a thermoplastic resin skin, said thermoplastic resin skin being 1 to 50 wt % of said acrylic rubber particles, wherein each of said acrylic rubber particles has epoxy groups on a surface thereof, and said acrylic rubber particles are present in an amount ranging between 2 and 40 parts by weight based on 100 parts by weight of said epoxy resin, wherein said inorganic filler is an alumina powder having a mean particle size by volume of 6 to 16 μm, and a particle size of at least 10 volume % of said alumina powder particles is 20 μm or greater, and wherein at least 90 volume % of said rubber particles are dispersed as discrete particles with a particle size by volume of 1 μm or less, said method comprising the steps of:

preparing a modified hardener by mixing said acrylic rubber particles with at least a portion of said acid anhydride by using shearing force applying means in sufficient force to uniformly disperse said rubber particles in said acid anhydride; and mixing said modified hardener and the remainder of said components.

11 Claims, No Drawings

METHOD OF MANUFACTURING A CASTABLE EPOXY RESIN COMPOSITION COMPRISING ACRYLIC RUBBER PARTICLES PREDISPERSED IN AN ANHYDRIDE HARDENER

This application is a Continuation of application Ser. No. 08/292,764, filed on Aug. 19, 1994, now abandoned.

BACKGROUND OF THE INVENTION

1. Field of the Invention

The present invention relates to an epoxy resin composition suitable as a casting material, particularly an electrical insulating casting material.

2. Description of the Related Art

An epoxy resin composition is used in a wide variety of applications and is also used extensively as an electrical insulating material by taking advantage of its electrical insulating function.

Incidentally, an insulating material for a high-voltage electric apparatus is required to have a corona resistance. It is therefore essential to make the insulating material void-free after molding. For this reason, it is not possible to use injection molding or transfer molding as a molding method, so molding is performed by a casting method. Recently, a demand has increasingly arisen for an improvement in the crack resistance of an electrical insulating epoxy resin casting material for particularly large-size, high-voltage electric apparatuses.

As a method of improving the crack resistance of a molding material, various methods, such as the method described in Jpn. Pat. Appln. KOKAI Publication No. 61-2088107, are known. Of these methods, however, those which can be applied to cast molding using a liquid resin are limited to a few methods, e.g., a method using a flexible epoxy resin, a method of blending liquid rubber, and a method of increasing the density of a filler. Jpn. Pat. Appln. KOKAI Publication No. 2-288107 has disclosed a molding material mixed with styrene-butadiene rubber particles having a thermoplastic resin skin, i.e., a so-called MBS powder, indicating that the fracture toughness is improved by the MBS powder. "MBS" is a recognized term in the art meaning a copolymer of: methylmethacrylate/butadiene/styrene.

If, however, the crack resistance of an epoxy resin casting material is improved by using the above methods, other properties of the material are degraded. For example, when liquid rubber or the like is used, the rubber separates from the matrix resin upon hardening, and the resulting boundary surface acts as a defect. This results in a decrease in electrical characteristics, such as the corona generating voltage or the dielectric breakdown voltage. The method using a flexible epoxy resin leads to decreases in heat resistance, mechanical strength, particularly flexural strength, moldability, and workability. The method of increasing the density of a filler increases the viscosity, and this degrades the moldability and the workability. The molding material containing the MBS powder has a large fracture toughness. However, the heat resistance of the material is low since degradation caused by heat of the MBS powder is significant. In effect, the surface of the material changes its color to yellow due to heat during hardening by heating, indicating the degradation occurring in the stage of hardening.

As described above, although the epoxy resin composition is widely used as an electrical insulating material, its application is not limited to this one. That is, the epoxy resin composition is also frequently used as the material of structural members. Therefore, the epoxy resin composition is required to be improved in other characteristics in accordance with the application.

SUMMARY OF THE INVENTION

It is an object of the present invention to provide an epoxy resin composition which has improved crack resistance and heat resistance without degrading other electrical characteristics, and also has various good mechanical characteristics.

The present inventors have made extensive studies in consideration of the above situation and found that the above object can be achieved by an epoxy resin composition containing an epoxy resin, an acid anhydride, an inorganic filler, and rubber particles having a thermoplastic resin skin, in which (1) specific acrylic rubber particles are used as the rubber particles, (2) an alumina powder with a specific particle size is used as the inorganic filler, or (3) the rubber particles are dispersed in a specific form, thereby completing the present invention.

That is, the first epoxy resin composition according to the present invention is an epoxy resin composition containing an epoxy resin, an acid anhydride, an inorganic filler, and acrylic rubber particles having a thermoplastic resin skin, wherein each of the acrylic rubber particles has epoxy groups on the surface.

The second epoxy resin composition according to the present invention is an epoxy resin composition containing an epoxy resin, an acid anhydride, an inorganic filler, and rubber particles having a thermoplastic resin skin, wherein the inorganic filler is an alumina powder, a mean particle size of the alumina powder is 6 to 16 μm, and a particle size of 10 vol % or more of particles of the alumina powder is 20 μm or more.

The third epoxy resin composition according to the present invention is an epoxy resin composition containing an epoxy resin, an acid anhydride, an inorganic filler, and rubber particles having a thermoplastic resin skin, wherein 90 vol % or more of the rubber particles are dispersed as discrete particles with a particle size of 1 μm or less.

DETAILED DESCRIPTION OF THE PREFERRED EMBODIMENTS

The compositions of the present invention will be described in more detail below. Note that in the following description, a rubber particle having a thermoplastic resin skin is referred to as a "composite rubber particle, "a composite rubber particle whose rubber component is acrylic rubber is referred to as a "composite acrylic rubber particle," and a composite acrylic rubber particle having epoxy groups on its surface is referred to as an "epoxy-group-containing acrylic rubber particle."

As the epoxy resin to be used in the first epoxy resin composition of the present invention, any epoxy resin can be used as long as the resin has two or more epoxy groups in each molecule. Examples of the epoxy resin are a liquid epoxy resin, e.g., a glycidyl ether epoxy resin, such as bisphenol A diglycidyl ether and bisphenol F diglycidyl ether; a cyclic aliphatic epoxy resin, such as 3,4-epoxycyclohexylmethylcarboxylate; and a glycidyl ester epoxy resin, such as glycidyl hexahydrophthalate ester, and a polyfunctional epoxy resin, e.g., a phenol novolak epoxy resin, a cresol novolak epoxy resin, tri(phenylglycidyl ether)

methane, tetra(phenylglycidyl ether) methane, a bromated phenol novolak epoxy resin, a dicyclopentadiene novolak epoxy resin, and a naphthol novolak epoxy resin.

The above liquid and polyfunctional epoxy resins can be used either singly or together. In respect of casting workability when these resins are used as a casting material, however, they are preferably combined such that the casting material in the form of a liquid is obtained. For example, when bisphenol A diglycidyl ether and a cresol novolak epoxy resin are mixed together, the viscosity of the resultant composition increases to degrade the workability if the amount of the cresol novolak epoxy resin exceeds 40 parts by weight. Therefore, the amount of the cresol novolak epoxy resin is desirably less than 40 parts by weight.

Examples of the acid anhydride to be used in the first epoxy resin composition of the present invention are phthalic anhydride, tetrahydrophthalic anhydride, hexahydrophthalic anhydride, methyltetrahydrophthalic anhydride, methylhexahydrophthalic anhydride, methylnadic anhydride, dodecylsuccinic anhydride, chlorendic anhydride, trialkyltetrahydrophthalic anhydride, glyceroltris (anhydrotrimellitate), ethyleneglycolbisanhydrotrimellitate, and 5-(2.5-dioxotetrahydrofuryl)-3-methyl-3-cyclohexene-1.2-dicarboxylic anhydride.

Although the above acid anhydrides can be used either singly or together, it is preferable to so combine them as to yield a liquid casting material in respect of casting workability. The most preferred acid anhydride in the first composition of the present invention is methylhexahydrophthalic anhydride. The mixing amount of the acid anhydride preferably ranges between 60 and 120% of a stoichiometric quantity with respect to an epoxy equivalent.

As the inorganic filler to be used in the first epoxy resin composition of the present invention, it is possible to use various well-known inorganic fillers, e.g., ceramics powders, such as an alumina powder, silicon nitride, and aluminum nitride, a fused silica powder, a glass powder, talc, kaolin, clay.

The above fillers can be used either singly or together. In particular, the use of a mixture of particles with a mean particle size of 10 to 30 μm and particles with a mean particle size of 0.5 to 5 μm at a mixing ratio of 90 to 70:10 to 30 is preferred since the flowability of the resultant composition is improved. Although the mixing amount of the fillers can be properly determined in accordance with the intended use, the amount is normally 30 to 50 vol % of the total volume of the composition.

The first epoxy resin composition of the present invention contains acrylic rubber particles having a thermoplastic resin skin and also having epoxy groups on the surface of each particle, i.e., epoxy-group-containing composite acrylic rubber particles. The epoxy-group-containing composite acrylic rubber particles are preferably particles with a mean particle size of about 0.1 to 2.0 μm manufactured by covering, with a thermoplastic resin, acrylic rubber particles having a mean particle size of about 0.06 to 1.0 μm and serving as cores, e.g., particles consisting of acrylic rubber containing alkyl acrylate ester as its main constituent. As the thermoplastic resin for covering the acrylic rubber particle as a core, it is possible to use, e.g., an acrylic resin, a styrene resin, or a copolymer of these resins. Of these materials, an acrylic resin is most preferred since the resultant composition can be improved in mechanical strength and electrical characteristics. It is preferable that the thermoplastic resin cover the acrylic rubber particle as a core by an amount of about 1 to 50 wt % of the acrylic rubber particle, resulting in a thickness of, e.g., 0.01 to 0.5 μm. More specifically, EXL-2314 (Kureha Chemical Industry Co., Ltd.) is an example of the epoxy-group-containing composite acrylic rubber particles which can be suitably used in the first epoxy resin composition of the present invention.

Generally, the epoxy-group-containing composite acrylic rubber particles with the above structure can be manufactured as follows. That is, a copolymer consisting of ethyl acrylate, butyl acrylate, or acrylonitrile as a monomer is crosslinked with a halogen-containing compound such as 2-chloroethylvinyl ether, or a compound such as glycidylacrylate, allylglycidyl ether, or ethylidenenorbornene, thereby obtaining acrylic rubber in the form of a latex. Subsequently, this acrylic rubber is graft-polymerized with a monomer composed of, e.g., methylmethacrylate and glycidyl methacrylate. In this fashion, the epoxy-group-containing composite acrylic rubber particles can be manufactured. In the manufacture, the amount of the glycidyl methacrylate contained in the monomer composition graft-polymerized to the acrylic rubber and constructing the skin is preferably 1 wt % or more. It is also possible to obtain the epoxy-group-containing composite acrylic rubber particles by manufacturing composite acrylic rubber particles having hydroxyl groups on the surface of each particle by using 2-hydroxyethyl methacrylate, in place of glycidyl methacrylate, and bonding a compound such as epichlorohydrin to the resultant particles by using a conventional method. In the case of epoxy-group-containing composite acrylic rubber particles obtained by the manufacturing method of this sort, the particles sometimes coagulate to form an aggregate with 100 to 500 μm in diameter. In the present invention, particles are preferably dispersed as finely as possible in the composition. In addition, although this epoxy-group-containing composite acrylic rubber particle already has an epoxy group on its surface, the particle can also have another functional group, e.g., a carboxyl group, an amino group, or a hydroxyl group, which reacts with an epoxy resin or an acid anhydride.

The content of the epoxy-group-containing composite acrylic rubber particles in the first epoxy resin composition of the present invention ranges between 2 and 40 parts by weight, preferably 4 and 20 parts by weight with respect to 100 parts by weight of the epoxy resin. If the content is less than 2 parts by weight, it is difficult to satisfactorily achieve the crack resistance improving effect. If the content exceeds 40 parts by weight, the viscosity of the composition tends to increase to degrade the flowability. This may lead to a decrease in the efficiency of casting work or degradation in the mechanical characteristics.

The epoxy-group-containing composite acrylic rubber particles in an appropriate amount within the above range improve the crack resistance of the composition. As described above, this epoxy-group-containing composite acrylic rubber particle has epoxy groups on its surface. Each of these epoxy groups chemically bonds to the epoxy resin as the matrix resin of the composition or the acid anhydride, improving the mechanical characteristics. The epoxy groups also increase the heat resistance by raising the thermal deformation temperature. In addition, the epoxy-group-containing composite acrylic rubber particle is stable against oxidation and has a high resistance to ultraviolet radiation or ozone, as compared with MBS. Consequently, the resultant composition is also improved in the resistance to thermal deterioration and the resistance to ultraviolet radiation or ozone. Also, since the density of the filler need not be increased, the composition is excellent in workability and moldability. Furthermore, the affinity between the matrix resin and the rubber particles is raised due to the functions of the thermoplastic resin and the epoxy group on the surface. This prevents decreases in the electrical characteristics, particularly the corona generating voltage and the dielectric breakdown voltage.

As the epoxy resin and the acid anhydride to be used in the second epoxy resin composition of the present invention, compounds equivalent to those used in the first epoxy resin composition discussed above can be used in similar amounts.

The second epoxy resin composition of the present invention uses, as the inorganic filler, an alumina (aluminum oxide) powder with a mean particle size of 6 to 16 μm, in which particles with a particle size of 20 μm or more occupy 10 vol % or more of all the particles.

In the field of an electrical insulating epoxy resin casting material, an epoxy resin casting material using an alumina powder as a filler has been conventionally used as an insulating material for a gas-insulated, high-voltage appliance in which $SF_6$ gas is sealed, for the reason to be explained below.

In a gas-sealed insulating appliance in which $SF_6$ gas is sealed, the $SF_6$ gas is used as an insulating medium and as an arc-suppressing medium. A fraction of this $SF_6$ gas is decomposed by arc or corona discharge generated when a large current is interrupted in the appliance, yielding an extremely highly reactive decomposition product, e.g., $SF_2$, $SF_4$, $S_2F_2$, $SOF_3$, $SOF_4$, or $SO_2F_4$. If any of these decomposition products, e.g., $SF_4$ comes into contact with water or steam, this $SF_4$ decomposes to produce hydrofluoric acid in accordance with Formulas (1) and (2) below:

$$SF_4+H_2O \rightarrow SOF_2+2HF \quad (1)$$

$$SOF_2+H_2O \rightarrow SO_2+2HF \quad (2)$$

On the other hand, the gas-sealed insulating appliance in which $SF_6$ gas is sealed also makes use of an insulating structure for supporting a conductor or a wire or for permitting the operation of the appliance. This insulating structure, therefore, is required to have a high $SF_6$ decomposed gas resistance by which it is not corroded by hydrofluoric acid which is highly corrosive. However, a filler mainly composed of $SiO_2$, e.g., glass or silica, which is normally used extensively as a filler for an epoxy resin casting material is unsuitable as a filler to be added to the insulating material of the gas-sealed insulating appliance in which $SF_6$ gas is sealed, since $SiO_2$ is corroded significantly by hydrofluoric acid. For this reason, an alumina powder is used as the filler, and there is no other choice when the $SF_6$ decomposed gas resistance is taken into consideration.

When, however, an alumina powder is used as a filler in an epoxy resin casting material containing an acid anhydride as a hardener, the mechanical characteristics, e.g., the flexural strength is degraded compared to an epoxy resin casting material using silica as a filler. As an example, the flexural strength of a casting material using an alumina powder as a filler is only about 78 to 98 MPa (8 to 10 kg/mm²), whereas the flexural strength of an epoxy casting material using silica as a filler is approximately 127 to 137 MPa (13 to 14 kg/mm²).

In addition, the insulating structural member used in such a gas-insulated appliance is constantly subjected to mechanical stress, so-called creep, due to the internal pressure difference of $SF_6$ gas. Therefore, an insulating structural member for use in particularly such a location is required to have good creep characteristics or constant load failure characteristics.

The second epoxy resin composition of the present invention meets the object of the present invention, which is to provide an epoxy resin composition having a high crack resistance and a high heat resistance and also having various excellent mechanical characteristics. The second epoxy resin composition also has a high $SF_6$ decomposed gas resistance resulting from the use of an alumina powder as a filler.

As discussed above, the alumina powder to be used in the second epoxy resin composition of the present invention has a mean particle size of 6 to 16 μm, in which particles with a particle size of 20 μm or more account for 10 vol % or more of all the particles. More preferably, the particle size of particles accounting for 10 to 30 vol % of all particles is 20 μm or more. If the mean particle size is smaller than 6 μm, the constant load failure characteristics tend to degraded, although the flexural strength increases. If the mean particle size is larger than 16 μm, on the other hand, the flexural strength tends to decrease. In addition, if the ratio of the particles with a particle size of 20 μm or more exceeds 30 vol %, abrasion of a mixing device proceeds to lead to a color change of the composition to grayish black, i.e., a defective outer appearance. In an extreme case, the electrical characteristics, particularly the insulation resistance may be impaired.

Generally, the addition of the inorganic filler increases the rigidity of the resultant composition to improve its constant load failure characteristics. Therefore, an alumina powder is preferably mixed in as large an amount as possible. However, the workability and the moldability of the composition are degraded by an alumina powder. For this reason, the amount of an alumina powder is preferably 45 vol % or less of the total volume of the composition.

High-purity, α-type alumina is favorable as this alumina powder. Practical examples are LA800, LA1200, and LA4000 (manufactured by Taiheiyo Random K.K.), FA-1, FA-4, FA-6, and A05S (manufactured by Showa Denko K.K.), RA and SA-1 (manufactured by Iwatani Kagaku Kogyo K.K.), and Admafine AO-C2 (manufactured by Tatsumori K.K.). These alumina powders can be used either singly or in a combination of two or more types thereof.

The rubber particles having a thermoplastic resin skin, i.e., the composite rubber particles to be used in the second epoxy resin composition of the present invention are preferably particles with a mean particle size of about 0.1 to 2.0 μm, which are manufactured by covering rubber particles having a mean particle size of about 0.06 to 1.0 μm and serving as cores, with a thermoplastic resin. Examples of the rubber particle serving as a core are an acrylic rubber particle consisting primarily of alkyl acrylate ester, a styrene-butadiene rubber particle, and a polybutadiene rubber particle. As the thermoplastic resin, it is possible to use, e.g., an acrylic resin, a styrene resin, or a copolymer of these resins. Of these materials, an acrylic resin is most preferred. An acrylic resin preferably covers the rubber particle as a core by an amount of 1 to 50 wt % of the rubber particle, resulting in a thickness of, e.g., 0.01 to 0.5 μm. Practical examples of the composite rubber particles are BTA-751 and EXL-2313 (manufactured by Kureha Chemical Industry Co., Ltd.)

Generally, the composite rubber particles with the above structure can be manufactured as follows. That is, the composite rubber particles are manufactured by graft-polymerizing a monomer consisting primarily of methyl-methacrylate and/or styrene on, e.g., styrene-butadiene rubber, polybutadiene rubber, or acrylic rubber in the form of a latex containing particles of 0.06 to 0.1 μm in particle size, which is obtained by a well-known method such as emulsion polymerization. The composite rubber particles obtained by the manufacturing method of this sort coagulate together to form an aggregate about 100 to 500 μm in diameter. In the present invention, the particles are preferably dispersed as finely as possible. It is more preferable that the particle have on its surface a functional group, e.g., an epoxy group, a carboxyl group, an amino group, or a hydroxyl group, which reacts with an epoxy resin or an acid anhydride as a hardener. The presence of an epoxy group is particularly preferred since the mechanical characteristics, the heat resistance, and the electrical characteristics are improved.

The mixing amount of these composite rubber particles preferably ranges from 2 to 40 parts by weight, particularly 4 to 20 parts by weight with respect to 100 parts by weight of the epoxy resin. If the mixing amount is less than 2 parts by weight, the crack resistance improving effect is insignificant. If the mixing amount exceeds 40 parts by weight, the viscosity of the resultant resin composition increases to degrade the flowability. This may lead to a decrease in the efficiency of casting work.

As the epoxy resin, the acid anhydride, and the inorganic filler to be used in the third epoxy resin composition according to the present invention, it is possible to use compounds equivalent to those used in the first and second epoxy resin compositions discussed above in similar mixing amounts.

In addition, as the rubber particles having a thermoplastic resin skin to be used in the third epoxy resin composition according to the present invention, composite rubber particles similar to those used in the second epoxy resin composition can be used in a similar mixing amount. Note that in this third epoxy resin composition, 90 vol % or more of the composite rubber particles are dispersed as discrete particles with a particle size of 1 μm or less.

The composition with the above state can be formed by mixing the composite rubber particles with a liquid component such as an epoxy resin and an inorganic filler for a long period of time, e.g., three hours or longer, adding a hardener, and further mixing the resultant material. In mixing the composite rubber particles with the epoxy resin, the inorganic filler, and the like, a high dispersibility can be obtained if the mixing temperature is 70° C. or higher and the viscosity of the mixture is 50 to 500 poises. If the viscosity or the temperature of the mixture is too low, no high dispersibility can be obtained; if the viscosity is too high, abrasion of an apparatus takes place. Another example of the manufacturing method is a method of evenly dispersing the particles by using a high-shearing-force application apparatus capable of applying a high shearing force, i.e., a mixing machine such as a roll mill. In this method, it is preferable in respect of workability that the hardener and the composite rubber particles be mixed in advance by the high-shearing-force application apparatus and then other components such as the epoxy resin be mixed. In addition, to well disperse the composite rubber particles, it is important to sufficiently melt or swell the thermoplastic resin in the surface layer of each particle in advance by using a liquid component such as the epoxy resin or the hardener. That is, it is preferable that the composite rubber particles be mixed with the liquid component in advance at 70° to 1000° C. for 1 to 24 hours by using a universal mixing machine or the like and then highly dispersed by a roll mill. The most preferred manufacturing method is to mix the hardener and the composite rubber particles in advance at 80° to 90° C. for 1 to 3 hours by using an apparatus such as a universal mixing machine and then highly disperse the resultant material by using a three-roll mill. This mixture is sometimes referred to as a modified hardener hereinafter. The composite rubber particles contained in this modified hardener preferably have a particle size distribution in which 50 vol % of the particles have a particle size of 0.8 μm or less and 90 vol % of the particles have a particle size of 2 μm or less. That is preferred because the dispersibility of the composite rubber particles in the resultant composition is improved. Subsequently, the modified hardener is mixed with the epoxy resin, the inorganic filler, and the like. In this case, the dispersibility of the inorganic filler is improved if the epoxy resin and the inorganic filler are mixed beforehand.

The composition formed in this manner in which the composite rubber particles are highly dispersed is further improved in the mechanical characteristics and the heat resistance. Additionally, when this composition is hardened as a casting material by cast molding, a homogeneous hardened product in which the filler settles little can be obtained.

Any of the first to third epoxy resin compositions according to the present invention can be mixed, if necessary, with a hardening accelerator, a coupling agent for coupling the resin with the inorganic filler, or a coupling agent for coupling the inorganic filler with the composite rubber particles, in addition to the above components.

Examples of the hardening accelerator usable in any of the first to third epoxy resin compositions of the present invention are tertiary amines, such as benzyldimethylamine and trisdimethylaminophenol; imidazoles, such as 2-methyl-4-methylimidazole, 1-cyanoethyl-4-methylimidazole, and 1-benzyl-2-ethylimidazole, and their derivatives; 1,8-diazabicyclo(5,4,0)undecene-7 (DBU) and its salt; and a quaternary phosphonium salt. The use of DBU is particularly preferred since the high-voltage insulation characteristics of the composition improve. Examples of the coupling agent are a silane coupling agent such as γ-glycidoxypropyltrimethoxysilane, and a titanate coupling agent such as tetraoctylbis(ditridecyl-phosphite)titanate.

Each of the first to third epoxy resin composition of the present invention can be prepared by conventional methods. For example, individual components need only be mixed at predetermined ratios with heat in a vacuum. This makes it possible to yield an epoxy resin composition with a high crack resistance, a high heat resistance, and various good mechanical characteristics. However, the mechanical characteristics of the composition can be further improved by additionally performing the following procedures during the preparation.

The first method is to disperse the composite rubber particles uniformly in the acid anhydride or in a portion of the acid anhydride in advance by using a high-shearing-force applying means such as a roll mill, and then mix other components and the remainder of the acid anhydride (if any) to the dispersion, thereby preparing a composition. In mixing the composite rubber particles and the acid anhydride, a mixing machine such as a universal mixing machine also can be used, and this makes it possible to improve the workability. Additionally, in mixing the composite rubber particles and the acid anhydride, it is possible to add the above-mentioned hardening accelerator capable of accelerating the chemical reaction between the epoxy resin and the acid anhydride. Note that the addition amount of the accelerator is preferably 0.01 to 20 wt % of a normally employed addition amount. If an excessive amount of the hardening accelerator is added, the storage stability of the resultant composition may be degraded.

The second method is to first sufficiently bring the epoxy resin and the inorganic filler into contact with each other, i.e., sufficiently mix the epoxy resin and the inorganic filler prior to mixing other components of a composition, and then add the acid anhydride or a mixture of the acid anhydride and other components, thereby preparing the composition. With this method, the mechanical characteristics of the composition can be improved. This method is useful especially when the inorganic filler is an alumina powder. Although the mechanical characteristics improving mechanism of this method is unknown, its effect is notable; that is, it is possible to obtain mechanical characteristics that cannot be achieved by compositions prepared by conventional conditions under which a filler and an acid anhydride are simultaneously present in the initial periods of mixing.

The mixing time required to sufficiently bring the epoxy resin and the inorganic filler into contact with each other cannot be uniquely determined, since it depends upon the temperature during the mixing. An example of the mixing time is 30 minutes or more, preferably one hour or more in a mixing tank heated to 70° C. The mixing temperature is preferably 100° C. or less. If mixing is carried out at a temperature higher than 100° C., the flowability and the storage stability of the composition decrease, and the casting workability tends to decrease accordingly. However, when the inorganic filler is an alumina powder, almost no decrease in the mechanical strength results if the amount of the acid anhydride present in the initial periods of the mixing is 1 wt % or less of the alumina filler and 5 wt % or less of the epoxy resin, i.e., if the amount of the acid anhydride is very small. In that case, it is also possible to maintain the flowability and the storage stability of the composition high even if the mixing temperature is 100° C. or higher. Note that the coupling agent for coupling the epoxy resin with the inorganic filler discussed above can also be used in mixing the epoxy resin and the inorganic filler.

The present invention will be described in more detail below by way of its examples.

Note that in the following examples, bisphenol A diglycidyl ether (R-140: manufactured by Mitsui Petrochemical Industries, Ltd.) was used as a liquid epoxy resin; a cresol novolak epoxy resin (EOCN-4400: manufactured by NIPPON KAYAKU CO., LTD.) was used as a polyfunctional epoxy resin; methylhexahydrophthalic anhydride (MH-700: manufactured by New Japan Chemical Co., Ltd.) was used as an acid anhydride; Silica Powder Crystallite A-1 (manufactured by Tatsumori K.K.) and Alumina Powders LA-800 (the mean particle size is 18 µm, and the ratio of particles with a particle size of 20 µm or more is 38%: manufactured by Taiheiyo Random K.K.) and LA-4000 (the mean particle size is 4 µm, and the ratio of particles with a particle size of 20 µm or more is 1% or less: manufactured by Taiheiyo Random K.K.) were used as inorganic fillers; EXL-2313 (manufactured by Kureha Chemical Industry Co., Ltd.) was used as composite acrylic rubber particles having a surface layer consisting of an acrylic resin; EXL-2314 (manufactured by Kureha Chemical Industry Co., Ltd.) was used as epoxy-group-containing composite acrylic rubber particles having a surface layer consisting of an acrylic resin having an epoxy group on the surface; BTA-751 (manufactured by Kureha Chemical Industry Co., Ltd.) was used as composite butadiene rubber particles; DBU (manufactured by SANAPRO K.K.), a quaternary phosphonium salt (U-CAT SA5003: manufactured by SANAPRO K.K.), and $C_{11}{}^Z$ (2-undecylimidazole: manufactured by Shikoku Chemicals Corp.) were used as hardening accelerators; and A-187 (manufactured by Nippon Uniker K.K.) was used as a silane coupling agent. Note also that the universal mixing machine used in the following examples is available from Sanei Seisakusho, and the CDM coaxial two-shaft mixer, the three-roll mill, and the spike mill are available from Inoue Seisakusho.

Preparation of Modified Hardeners (i) Modified hardener (A)

A modified hardener (A) was prepared by mixing 100 parts by weight of an acid anhydride and 32 parts by weight of epoxy-group-containing composite acrylic rubber particles at 80° C. for three hours by using the universal mixing machine.

The particle size distribution of the epoxy-group-containing composite acrylic rubber particles in the resultant modified hardener was measured. Consequently, it was found that the particle size of 50 vol % of the particles was 10 µm or less and the particle size of 90 vol % of the particles was 38 µm or less.

(ii) Modified hardener (B)

A modified hardener (B) was prepared by mixing 100 parts by weight of an acid anhydride and 32 parts by weight of epoxy-group-containing composite acrylic rubber particles at 80° C. for two hours by using the universal mixing machine, and further dispersing the particles by using the three-roll mill. Note that the spacings between the individual rolls of the three-roll mill were 0.02 to 0.08 mm, and the flow rate during the mixing was 6 kg/hour.

The particle size distribution of the epoxy-group-containing composite acrylic rubber particles in the resultant modified hardener was measured. Consequently, it was found that the particle size of 50 vol % of the particles was 0.72 µm or less and the particle size of 90 vol % of the particles was 1.20 µm or less.

(iii) Modified hardener (C)

A modified hardener (C) was prepared by mixing 100 parts by weight of an acid anhydride and 32 parts by weight of epoxy-group-containing composite acrylic rubber particles at 80° C. for three hours by using the CDM coaxial two-shaft mixer.

The particle size distribution of the epoxy-group-containing composite acrylic rubber particles in the resultant modified hardener was measured. Consequently, it was found that the particle size of 50 vol % of the particles was 0.72 µm and the particle size of 90 vol % of the particles was 18.0 µm.

(iv) Modified hardener (D)

100 parts by weight of an acid anhydride and 32 parts by weight of epoxy-group-containing composite acrylic rubber particles were mixed at 80° C. for one hour by using the universal mixing machine. 0.1 part by weight of U-CAT SA5003 was added to the resultant mixture, and the mixture was further mixed for one hour. Thereafter, the particles were dispersed by using the three-roll mill following the same procedures as for the modified hardener (B), yielding a modified hardener (D).

The particle size distribution of the epoxy-group-containing composite acrylic rubber particles in the resultant modified hardener was measured. Consequently, it was found that the particle size of 50 vol % of the particles was 0.72 µm and the particle size of 90 vol % of the particles was 1.21 µm.

(v) Modified hardener (E)

A modified hardener (E) was prepared by mixing 100 parts by weight of an acid anhydride and 32 parts by weight of epoxy-group-containing composite acrylic rubber particles at 80° C. for two hours by using the universal mixing machine, and further dispersing the particles by using the spike mill.

The particle size distribution of the epoxy-group-containing composite acrylic rubber particles in the resultant modified hardener was measured. Consequently, it was found that the particle size of 50 vol % of the particles was 0.67 µm and the particle size of 90 vol % of the particles was 1.21 µm.

(vi) Modified hardener (F)

A modified hardener (F) was prepared following the same procedures as for the modified hardener (B) by using 100 parts by weight of an acid anhydride and 32 parts by weight of composite acrylic rubber particles.

The particle size distribution of the composite acrylic rubber particles in the resultant modified hardener was measured. Consequently, it was found that the particle size of 50 vol % of the particles was 0.72 µm and the particle size of 90 vol % of the particles was 1.20 µm.

EXAMPLE 1

An epoxy resin, an acid anhydride, an inorganic filler (a silica powder), epoxy-group-containing composite acrylic rubber particles, and a silane coupling agent were mixed in a vacuum in the mixing amounts listed in Table 1 (to be presented later), except for the acid anhydride that was mixed in an amount half the mixing amount listed, at 80° C. for four hours by using the universal mixing machine. Subsequently, the remaining half of the acid anhydride was blended, and the resultant material was mixed in a vacuum for one hour. Thereafter, a hardening accelerator was added in the mixing amount listed in Table 1, and the resultant material was mixed in a vacuum for 30 minutes. In this manner, a composition was prepared.

EXAMPLE 2

An epoxy resin, an acid anhydride, an inorganic filler (an alumina powder), epoxy-group-containing composite acrylic rubber particles, and a silane coupling agent were mixed in a vacuum in the mixing amounts listed in Table 1, except for the acid anhydride that was mixed in an amount half the mixing amount listed, at 80° C. for four hours by using the universal mixing machine. Subsequently, the remaining half of the acid anhydride was blended, and the resultant material was mixed in a vacuum for one hour. Thereafter, a hardening accelerator was added in the mixing amount listed in Table 1, and the resultant material was mixed in a vacuum for 30 minutes. In this manner, a composition was prepared.

EXAMPLE 3

An epoxy resin, an acid anhydride, an alumina powder with a specific particle size, composite butadiene acrylic rubber particles, and a silane coupling agent were mixed in a vacuum in the mixing amounts listed in Table 1, except for the acid anhydride that was mixed in an amount half the mixing amount listed, at 80° C. for four hours by using the universal mixing machine. Subsequently, the remaining half of the acid anhydride was blended, and the resultant material was mixed in a vacuum for one hour. Thereafter, a hardening accelerator was added in the mixing amount listed in Table 1, and the resultant material was mixed in a vacuum for 30 minutes. In this manner, a composition was prepared.

EXAMPLE 4

An epoxy resin, an acid anhydride, an inorganic filler (a silica powder), and a silane coupling agent were mixed in a vacuum in the mixing amounts listed in Table 1 at 80° C. for four hours by using the universal mixing machine. Subsequently, the modified hardener (B) (containing epoxy-group-containing composite acrylic rubber particles) was blended in the mixing amount shown in Table 1, and the resultant material was mixed in a vacuum for one hour. Thereafter, a hardening accelerator was added in the mixing amount listed in Table 1, and the resultant material was mixed in a vacuum for 30 minutes. In this manner, a composition was prepared.

EXAMPLE 5

An epoxy resin, an acid anhydride, an alumina powder with a specific particle size, and a silane coupling agent were mixed in a vacuum in the mixing amounts listed in Table 1 at 80° C. for two hours by using the universal mixing machine. Subsequently, the modified hardener (B) (containing epoxy-group-containing composite acrylic rubber particles) was blended in the mixing amount shown in Table 1, and the resultant material was mixed in a vacuum for one hour. Thereafter, a hardening accelerator was added in the mixing amount listed in Table 1, and the resultant material was mixed in a vacuum for 30 minutes. In this manner, a composition was prepared.

EXAMPLE 6

An epoxy resin, an inorganic filler (an alumina powder), epoxy-group-containing composite acrylic rubber particles, and a silane coupling agent were mixed in a vacuum in the mixing amounts listed in Table 1 at 80° C. for four hours by using the universal mixing machine. Subsequently, an acid anhydride was blended in the mixing amount shown in Table 1, and the resultant material was mixed in a vacuum for one hour. Thereafter, a hardening accelerator was added in the mixing amount listed in Table 1, and the resultant material was mixed in a vacuum for 30 minutes. In this manner, a composition was prepared.

EXAMPLE 7

An epoxy resin, an alumina powder with a specific particle size, composite butadiene rubber particles, and a silane coupling agent were mixed in a vacuum in the mixing amounts listed in Table 1 at 80° C. for four hours by using the universal mixing machine. Subsequently, an acid anhydride was blended in the mixing amount shown in Table 1, and the resultant material was mixed in a vacuum for one hour. Thereafter, a hardening accelerator was added in the mixing amount listed in Table 1, and the resultant material was mixed in a vacuum for 30 minutes. In this manner, a composition was prepared.

EXAMPLE 8

An epoxy resin, an alumina powder with a specific particle size, and a silane coupling agent were mixed in a vacuum in the mixing amounts listed in Table 1 at 80° C. for two hours by using the universal mixing machine. Subsequently, the modified hardener (B) and an acid anhydride were blended in the mixing amount shown in Table 1, and the resultant material was mixed in a vacuum for one hour. Thereafter, a hardening accelerator was added in the mixing amount listed in Table 1, and the resultant material was mixed in a vacuum for 30 minutes. In this manner, a composition was prepared.

EXAMPLE 9

An epoxy resin, an alumina powder with a specific particle size, and a silane coupling agent were mixed in a vacuum in the mixing amounts listed in Table 1 at 80° C. for two hours by using the universal mixing machine. Subsequently, the modified hardener (B) and an acid anhydride were blended in the mixing amount shown in Table 1, and the resultant material was mixed in a vacuum for one hour. Thereafter, a hardening accelerator was added in the mixing amount listed in Table 1, and the resultant material was mixed in a vacuum for 30 minutes. In this manner, a composition was prepared.

EXAMPLE 10

An epoxy resin, an alumina powder with a specific particle size, and a silane coupling agent were mixed in a vacuum in the mixing amounts listed in Table 1 at 80° C. for two hours by using the universal mixing machine. Subsequently, the modified hardener (A) and an acid anhydride were blended in the mixing amount shown in Table 1, and the resultant material was mixed in a vacuum for one hour. Thereafter, a hardening accelerator was added in the mixing amount listed in Table 1, and the resultant material was mixed in a vacuum for 30 minutes. In this manner, a composition was prepared.

EXAMPLE 11

An epoxy resin, an alumina powder with a specific particle size, and a silane coupling agent were mixed in a vacuum in the mixing amounts listed in Table 1 at 80° C. for two hours by using the universal mixing machine. Subsequently, the modified hardener (C) and an acid anhydride were blended in the mixing amount shown in Table 1, and the resultant material was mixed in a vacuum for one hour. Thereafter, a hardening accelerator was added in the mixing amount listed in Table 1, and the resultant material was mixed in a vacuum for 30 minutes. In this manner, a composition was prepared.

EXAMPLE 12

An epoxy resin, an alumina powder with a specific particle size, and a silane coupling agent were mixed in a vacuum in the mixing amounts listed in Table 1 at 80° C. for two hours by using the universal mixing machine. Subsequently, the modified hardener (D) and an acid anhydride were blended in the mixing amount shown in Table 1, and the resultant material was mixed in a vacuum for one hour. Thereafter, a hardening accelerator was added in the mixing amount listed in Table 1, and the resultant material was mixed in a vacuum for 30 minutes. In this manner, a composition was prepared.

EXAMPLE 13

An epoxy resin, an alumina powder with a specific particle size, and a silane coupling agent were mixed in a vacuum in the mixing amounts listed in Table 1 at 80° C. for two hours by using the universal mixing machine. Subsequently, the modified hardener (E) and an acid anhydride were blended in the mixing amount shown in Table 1, and the resultant material was mixed in a vacuum for one hour. Thereafter, a hardening accelerator was added in the mixing amount listed in Table 1, and the resultant material was mixed in a vacuum for 30 minutes. In this manner, a composition was prepared.

EXAMPLE 14

An epoxy resin, an alumina powder with a specific particle size, epoxy-group-containing composite acrylic rubber particles, and a silane coupling agent were mixed in a vacuum in the mixing amounts listed in Table 1 at 80° C. for four hours by using the universal mixing machine. Subsequently, an acid anhydride was blended in the mixing amount shown in Table 1, and the resultant material was mixed in a vacuum for one hour. Thereafter, a hardening accelerator was added in the mixing amount listed in Table 1, and the resultant material was mixed in a vacuum for 30 minutes. In this manner, a composition was prepared.

EXAMPLE 15

An epoxy resin, an alumina powder with a specific particle size, composite acrylic rubber particles, and a silane coupling agent were mixed in a vacuum in the mixing amounts listed in Table 1 at 80° C. for four hours by using the universal mixing machine. Subsequently, an acid anhydride was blended in the mixing amount shown in Table 1, and the resultant material was mixed in a vacuum for one hour. Thereafter, a hardening accelerator was added in the mixing amount listed in Table 1, and the resultant material was mixed in a vacuum for 30 minutes. In this manner, a composition was prepared.

EXAMPLE 16

An epoxy resin, an alumina powder with a specific particle size, and a silane coupling agent were mixed in a vacuum in the mixing amounts listed in Table 1 at 80° C. for two hours by using the universal mixing machine. Subsequently, the modified hardener (F) and an acid anhydride were blended in the mixing amount shown in Table 1, and the resultant material was mixed in a vacuum for one hour. Thereafter, a hardening accelerator was added in the mixing amount listed in Table 1, and the resultant material was mixed in a vacuum for 30 minutes. In this manner, a composition was prepared.

EXAMPLE 17

An epoxy resin, an inorganic filler (an alumina powder), epoxy-group-containing composite acrylic rubber particles, and a silane coupling agent were mixed in a vacuum in the mixing amounts listed in Table 1 at 80° C. for four hours by using the universal mixing machine. Subsequently, an acid anhydride was blended in the mixing amount shown in Table 1, and the resultant material was mixed in a vacuum for one hour. Thereafter, a hardening accelerator was added in the mixing amount listed in Table 1, and the resultant material was mixed in a vacuum for 30 minutes. In this manner, a composition was prepared.

EXAMPLE 18

An epoxy resin, an inorganic filler (a silica powder), epoxy-group-containing composite acrylic rubber particles, and a silane coupling agent were mixed in a vacuum in the mixing amounts listed in Table 1 at 80° C. for four hours by using the universal mixing machine. Subsequently, an acid anhydride was blended in the mixing amount shown in Table 1, and the resultant material was mixed in a vacuum for one hour. Thereafter, a hardening accelerator was added in the mixing amount listed in Table 1, and the resultant material was mixed in a vacuum for 30 minutes. In this manner, a composition was prepared.

COMPARATIVE EXAMPLE 1

An epoxy resin, an acid anhydride, an inorganic filler (a silica powder), and a silane coupling agent were mixed in a vacuum in the mixing amounts listed in Table 1, except for the acid anhydride that was mixed in an amount half the mixing amount listed, at 80° C. for four hours by using the universal mixing machine. Subsequently, the remaining half of the acid anhydride was blended, and the resultant material was mixed in a vacuum for one hour. Thereafter, a hardening accelerator was added in the mixing amount listed in Table 1, and the resultant material was mixed in a vacuum for 30 minutes. In this manner, a composition was prepared.

COMPARATIVE EXAMPLE 2

An epoxy resin, an acid anhydride, an alumina powder with a specific particle size, and a silane coupling agent were mixed in a vacuum in the mixing amounts listed in Table 1, except for the acid anhydride that was mixed in an amount half the mixing amount listed, at 80° C. for four hours by using the universal mixing machine. Subsequently, the remaining half of the acid anhydride was blended, and the resultant material was mixed in a vacuum for one hour. Thereafter, a hardening accelerator was added in the mixing amount listed in Table 1, and the resultant material was mixed in a vacuum for 30 minutes. In this manner, a composition was prepared.

COMPARATIVE EXAMPLE 3

In the universal mixing machine, an epoxy resin and an acid anhydride in the mixing amounts listed in Table 1 were heated to 80° C., and a silane coupling agent was added and mixed. Thereafter, epoxy-group-containing composite acrylic rubber particles were gradually added, and the resultant material was mixed for five minutes. Subsequently, an alumina powder was gradually added to the obtained mixture, and the resultant material was mixed in a vacuum for 10 minutes. Lastly, a hardening accelerator was added, and the resultant material was mixed in a vacuum for 10 minutes. In this manner, a composition was prepared.

The crack resistance, the heat resistance, the electrical characteristics, and the mechanical characteristics of each composition prepared as described above were evaluated. The results are summarized in Table 2 (to be presented later). Note that the evaluations of these characteristics were performed in accordance with the following methods.

Deflection temperature under load: The deflection temperature under load was measured in accordance with JIS K6911 by using molded test pieces with dimensions of 12.7 mm×12.7 mm×150 mm.

Crack resistance: Molded test pieces 60 mm in diameter and 15 mm in height, in each of which a metal insert (a copper orifant washer) was embedded, were sequentially applied with thermal shock under the conditions shown in Table 3 (to be presented later). The crack resistance of each material is represented by using a crack index at which a crack was occurred in that material.

Flexural strength: The flexural strength was measured in accordance with JIS K6911 by using molded test pieces with dimensions of 4 mm×10 mm×80 mm.

Insulation resistance: The insulation resistance was measured in accordance with JIS K6911 by using molded test pieces with dimensions of 2 mm×100 mm×100 mm.

Corona generating voltage: The corona generating voltage was measured by using test pieces in each of which aluminum electrodes were embedded.

Constant load failure time: In accordance with the JIS K-7116 bending creep test method for plastics, test pieces with dimensions of 4 mm×10 mm×80 mm were applied with a bending stress of 54 MPa (5.5 kg/mm$^2$), and the time required for each test piece to break was measured. Note that the test was conducted in a constant temperature bath at 115° C.

Sedimentation degree: Columnar test pieces 18 mm in diameter and 200 mm in height were raised and hardened, and the filler concentrations (wt %) at positions 5 mm from both the ends of each test piece were measured. The sedimentation degree is represented by the concentration difference between the upper and lower portions.

Abrasion of the apparatus: Abrasion of the apparatus was evaluated from the outer appearance of each casting material: that is, if the casting material changed its color into grayish black, abrasion was evaluated as "found"; if the casting material was white, abrasion was evaluated as "none."

Weight change upon heating: Molded test pieces with dimensions of 40 mm×40 mm×2 mm were left to stand in a dryer at 200° C. for a predetermined time, and the weight of each test piece was measured. The weight change upon heating is represented by the decrease in weight in percentage.

TABLE 1

|  | Example 1 | Example 2 | Example 3 | Example 4 | Example 5 | Example 6 | Example 7 | Example 8 | Example 9 | Example 10 | Example 11 |
| --- | --- | --- | --- | --- | --- | --- | --- | --- | --- | --- | --- |
| R-140 | 70 | 70 | 70 | 70 | 70 | 70 | 70 | 70 | 70 | 70 | 70 |
| EOCN-4400 | 30 | 30 | 30 | 30 | 30 | 30 | 30 | 30 | 30 | 30 | 30 |
| MH-700 |  |  |  |  |  |  |  |  |  |  |  |
| (first addition) | 40 | 40 | 40 | 30 | 30 | — | — | — | — | — | — |
| (second addition) | 40 | 40 | 40 | — | — | 80 | 80 | 30 | 30 | 30 | 30 |
| Crystallite A-1 | 310 | — | — | 310 | — | — | — | — | — | — | — |
| LA-800 | — | 450 | 270 | — | 270 | 450 | 270 | 270 | 270 | 270 | 270 |
| LA-4000 | — | — | 180 | — | 180 | — | 180 | 180 | 180 | 180 | 180 |
| BTA-751 | — | — | 16 | — | — | — | 16 | — | — | — | — |
| EXL-2313 | — | — | — | — | — | — | — | — | — | — | — |
| EXL-2314 | 16 | 16 | — | — | — | 16 | — | — | — | — | — |
| Modified hardener A | — | — | — | — | — | — | — | — | — | 66 | — |
| Modified | — | — | — | 66 | 66 | — | — | 66 | 66 | — | — |

TABLE 1-continued

|  | | | | | | | | | | |
|---|---|---|---|---|---|---|---|---|---|---|
| hardener B | | | | | | | | | | |
| Modified hardener C | — | — | — | — | — | — | — | — | — | 66 |
| Modified hardener D | — | — | — | — | — | — | — | — | — | — |
| Modified hardener E | — | — | — | — | — | — | — | — | — | — |
| Modified hardener F | — | — | — | — | — | — | — | — | — | — |
| DBU | 0.3 | 0.3 | 0.3 | 0.3 | 0.3 | 0.3 | 0.3 | — | 0.3 | 0.3 | 0.3 |
| $C_{11}Z$ | — | — | — | — | — | — | — | 0.3 | — | — |
| A-187 | 1.0 | 1.0 | 1.0 | 1.0 | 1.0 | 1.0 | 1.0 | 1.0 | 1.0 | 1.0 | 1.0 |

|  | Example 12 | Example 13 | Example 14 | Example 15 | Example 16 | Example 17 | Example 18 | Comparative Example 1 | Comparative Example 2 | Comparative Example 3 |
|---|---|---|---|---|---|---|---|---|---|---|
| R-140 | 70 | 70 | 70 | 70 | 70 | 70 | 70 | 70 | 70 | 70 |
| EOCN-4400 | 30 | 30 | 30 | 30 | 30 | 30 | 30 | 30 | 30 | 30 |
| MH-700 | | | | | | | | | | |
| (first addition) | — | — | — | — | — | — | — | 40 | 40 | 80 |
| (second addition) | 30 | 30 | 80 | 80 | 30 | 80 | 80 | 40 | 40 | — |
| Crystallite A-1 | — | — | — | — | — | — | 310 | 310 | — | — |
| LA-800 | 270 | 270 | 270 | 270 | 270 | — | — | — | 270 | 450 |
| LA-4000 | 180 | 180 | 180 | 180 | 180 | 450 | — | — | 180 | — |
| BTA-751 | — | — | — | — | — | — | — | — | — | 16 |
| EXL-2313 | — | — | — | 16 | — | — | — | — | — | — |
| EXL-2314 | — | — | 16 | — | — | 16 | 16 | — | — | — |
| Modified hardener A | — | — | — | — | — | — | — | — | — | — |
| Modified hardener B | — | — | — | — | — | — | — | — | — | — |
| Modified hardener C | — | — | — | — | — | — | — | — | — | — |
| Modified hardener D | 66 | — | — | — | — | — | — | — | — | — |
| Modified hardener E | — | 66 | — | — | — | — | — | — | — | — |
| Modified hardener F | — | — | — | — | 66 | — | — | — | — | — |
| DBU | 0.3 | 0.3 | 0.3 | 0.3 | 0.3 | 0.3 | 0.3 | — | — | — |
| $C_{11}Z$ | — | — | — | — | — | — | — | 0.3 | 0.3 | 0.3 |
| A-187 | 1.0 | 1.0 | 1.0 | 1.0 | 1.0 | 1.0 | 1.0 | 1.0 | 1.0 | 1.0 |

TABLE 2

|  | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|
| Deflection temperature under load (°C.) | 168 | 168 | 166 | 172 | 172 | 168 | 166 | 175 | 172 | 166 | 168 |
| Crack resistance (Ci) | 12.8 | 7.0 | 7.0 | 14.0 | 10.0 | 10.0 | 8.2 | 13.2 | 14 | 8.8 | 10.0 |
| Flexural strength (MPa) | 132 | 96 | 96 | 138 | 103 | 122 | 123 | 128 | 131 | 122 | 123 |
| Insulation resistance (Ω · cm) | $10^{15}$ or more | $10^{15}$ or more | $10^{15}$ or more | $10^{15}$ or more | $10^{15}$ or more | $3 \times 10^{14}$ | $10^{15}$ or more | $10^{15}$ or more | $10^{15}$ or more | $10^{15}$ or more | $10^{15}$ or more |
| Corona generating voltage (kV) | 160 or more | 160 or more | 160 or more | 160 or more | 160 or more | 160 or more | 160 or more | 140 | 160 or more | 160 or more | 160 or more |
| Constant load failure time (hours) | 180 | 110 | 80 | 200 | 125 | 160 | 150 | 180 | 180 | 155 | 160 |
| Sedimentation degree | 0.8 | 2.5 | 1.5 | 0.5 | 1.0 | 2.5 | 1.5 | 1.0 | 1.0 | 1.0 | 1.0 |
| Abrasion of the apparatus | None | None | None | None | None | Found | None | None | None | None | None |
| Weight change upon heating (%) | 0.6 | 0.6 | 1.0 | 0.6 | 0.6 | | | | | | |

TABLE 2-continued

| Weight change upon heating (%) | 0.6 | 1.0 | 0.6 | 0.6 | 0.6 | 0.6 |

| | Example 12 | Example 13 | Example 14 | Example 15 | Example 16 |
|---|---|---|---|---|---|
| Deflection temperature under load (°C.) | 173 | 168 | 168 | 166 | 166 |
| Crack resistance (Ci) | 13.6 | 10.4 | 12.4 | 12.0 | 12.0 |
| Flexural strength (MPa) | 132 | 123 | 126 | 123 | 123 |
| Insulation resistance (Ω · cm) | $10^{15}$ or more | $10^{15}$ or more | $10^{15}$ or more | $10^{15}$ or more | $10^{15}$ or more |
| Corona generating voltage (kV) | 160 or more | 160 or more | 160 or more | 160 or more | 160 or more |
| Constant load failure time (hours) | 182 | 160 | 160 | 150 | 150 |
| Sedimentation degree | 1.0 | 1.0 | 1.5 | 1.5 | 1.0 |
| Abrasion of the apparatus | None | None | None | None | None |
| Weight change upon heating (%) | 0.6 | 0.6 | 0.6 | 0.6 | 0.6 |

| | Example 17 | Example 18 | Comparative Example 1 | Comparative Example 2 | Comparative Example 3 |
|---|---|---|---|---|---|
| Deflection temperature under load (°C.) | 166 | 168 | 168 | 168 | 166 |
| Crack resistance (Ci) | 12.4 | 12.8 | 1.0 | 0 | 6.6 |
| Flexural strength (MPa) | 130 | 133 | 138 | 108 | 78 |
| Insulation resistance (Ω · cm) | $8 \times 10^{14}$ | $10^{15}$ or more | $10^{15}$ or more | $10^{15}$ or more | $10^{15}$ or more |
| Corona generating voltage (kv) | 160 or more | 160 or more | 160 or more | 160 or more | 120 |
| Constant load failure time (hours) | 140 | 180 | 200 | 100 | 40 |
| Sedimentation degree | 1.0 | 0.8 | 4.0 | 5.0 | 3.0 |
| Abrasion of the apparatus | Found | None | None | None | None |
| Weight change upon heating (%) | 0.6 | 0.6 | 0.6 | 0.6 | 1.0 |

TABLE 3

| Crack index (Ci) | Test results |
|---|---|
| 0 | Hardening temperature → room temperature × 24 hrs |
| 1 | 25° C. → 5° C. × 10 min |
| 2 | 5° C. → 25° C. × 30 min |
| 3 | 25° C. → −15° C. × 10 min |
| 4 | −15° C. → 25° C. × 30 min |
| 5 | 25° C. → −35° C. × 10 min |
| 6 | −35° C. → 25° C. × 30 min |
| 7 | 25° C. → −55° C. × 10 min |
| 8 | −55° C. → 25° C. × 30 min |
| 9 | 25° C. → 130° C. × 30 min |
| 10 | 130° C. → −55° C. × 10 min |
| 11 | −55° C. → 150° C. × 30 min |
| 12 | 150° C. → −75° C. × 10 min |
| 13 | −75° C. → 170° C. × 30 min |
| 14 | 170° C. → −75° C. × 10 min |
| 15 | −75° C. → 25° C. × 10 min |
| 16 | No cracks occurred |

Note that the unit of each numeric value shown in Table 1 is parts by weight. Note also that the mixture of LA-800 and LA-4000 used as an alumina powder had a mean particle size of 6.5 μm, and the ratio of particles with a particle size of 20 μm or more in that powder was 16%.

As is apparent from Table 2, each composition according to the present invention had a high crack resistance, a high heat resistance, and good electrical and mechanical characteristics.

More specifically, the improvements in these characteristics were remarkable particularly in the compositions of Examples 8, 9, and 12 which were prepared by dispersing the epoxy-group-containing composite acrylic rubber particles in the acid anhydride in advance by using the three-roll mill, and first bringing the epoxy resin and the alumina powder into contact with each other. This reason can be considered that in these samples, the epoxy-group-containing composite acrylic rubber particles were evenly dispersed as discrete particles, and the epoxy groups present on the surface of each acrylic rubber particle bonded to the acid anhydride. Of these compositions, the composition using DBU as the hardening accelerator had an excellent withstand voltage characteristic.

The composition of Comparative Example 3 which was prepared by mixing the MBS powder in the epoxy resin in accordance with the conventional method had a low crack resistance, poor mechanical characteristics, and a low corona generating voltage in comparison with any example of the present invention. This reason for this can be assumed that the MBS powder was present in the form of an aggregate since the mixing time was short. In addition, the crack resistances were significantly low in the compositions of Comparative Examples 1 and 2 using no composite rubber particles.

As can be seen by comparing Example 18 with Example 1, no significant difference was found in mechanical strength between the compositions using a silica powder as a filler, in one of which the silica powder was brought into contact first with the epoxy resin and then with the acid anhydride, and in the other the silica powder was brought into contact first with the acid anhydride and then with the epoxy resin. In contrast, it is evident from the comparisons between Examples 2 and 6 and between Examples 5 and 9 that in the compositions using an alumina powder as a filler, the mechanical strength could be further increased by bringing the alumina powder into contact first with the epoxy resin.

In addition, in the compositions using an alumina powder as a filler, the best results could be obtained by the use of an alumina powder which had a mean particle size of 6 to 16 μm and in which particles with a particle size of 20 μm or more occupied 10 vol % or more. As an example, the composition using LA-800 (the mean particle size is 18 μm, and the ratio of particles with a particle size of 20 μm or more is 38 vol %) as an alumina powder was slightly inferior in flexural strength, abrasion of the apparatus, insulation resistance, and sedimentation degree. Also, the composition using LA-4000 (the mean particle size is 4 μm, and the ratio of particles with a particle size of 20 μm or more is 1 vol %) as an alumina powder was slightly inferior in constant load failure time, abrasion of the apparatus, and insulation resistance.

Examples 14 and 15 reveal that the mechanical strength could be further improved by the use of the composite acrylic rubber particles having an epoxy resin on the surface of each particle, i.e., the epoxy-group-containing composite acrylic rubber particles, as compared with the use of the composite acrylic rubber particles having no epoxy group on the surface of each particle. In addition, the improvements in particularly the heat resistance, the crack resistance, and the mechanical characteristics were remarkable in the compositions prepared by using the roll mill as a high-shearing-force applying means in dispersing the epoxy-group-containing composite acrylic rubber particles in the acid anhydride, compared to the compositions prepared by using another mixing machine.

As has been described above, the epoxy resin composition according to the present invention has a high crack resistance, a high heat resistance, and various good electrical and mechanical characteristics, and therefore can be suitably used as a casting material, particularly an electrical insulating casting material.

What is claimed is:

1. A method of manufacturing a castable epoxy resin composition which comprises as components an epoxy resin, an acid anhydride in an amount sufficient for hardening, an inorganic filler, and acrylic rubber particles having a thermoplastic resin skin, said thermoplastic resin skin being 1 to 50 wt % of said acrylic rubber particles, wherein each of said acrylic rubber particles has epoxy groups on a surface thereof, and said acrylic rubber particles are present in an amount ranging between 2 and 40 parts by weight based on 100 parts by weight of said epoxy resin, wherein said inorganic filler is an alumina powder having a mean particle size by volume of 6 to 16 µm, and a particle size of at least 10 volume % of said alumina powder particles is 20 µm or greater and wherein at least 90 volume % of said rubber articles are dispersed as discrete particles with a particle size by volume of 1 µm or less, said method comprising the steps of:

preparing a modified hardener by mixing said acrylic rubber particles with at least a portion of said acid anhydride by using shearing force applying means in sufficient force to uniformly disperse said rubber particles in said acid anhydride; and mixing said modified hardener and the remainder of said components.

2. The method according to claim 1, wherein said thermoplastic resin as the skin of said acrylic rubber particle is selected from the group consisting of an acrylic resin, a styrene resin, and an acrylic-styrene copolymer.

3. The method according to claim 1, wherein said epoxy resin is at least one resin selected from the group consisting of a glycidyl ether epoxy resin, a cyclic aliphatic epoxy resin, a glycidyl ester epoxy resin, a phenol novolak epoxy resin, a cresol novolak epoxy resin, tri(phenylglycidyl ether) methane, tetra(phenylglycidyl ether) methane, a brominated phenol novolak epoxy resin, a dicyclopentadiene novolak epoxy resin, and a naphthol novolak epoxy resin, said acid anhydride is at least one anhydride selected from the group consisting of phthalic anhydride, tetrahydrophthalic anhydride, hexahydrophthalic anhydride, methyltetrahydrophthalic anhydride, methylhexahydrophthalic anhydride, methylnadic anhydride, dodecylsuccinic anhydride, chlorendic anhydride, trialkyltetrahydrophthalic anhydride, glycerol tris(anhydrotrimellitate), ethylene glycolbisanhydrotrimellitate, and 5-(2,5-dioxotetrahydrofuryl)-3-methyl-3-cyclohexene-1,2-dicarboxylic anhydride, and said inorganic filler optionally contains additionally at least one material selected from the group consisting of a fused silica powder, a glass powder, talc, kaolin, clay, silicon nitride, and aluminum nitride.

4. The method according to claim 1, wherein said epoxy resin is a mixture of bisphenol A diglycidyl ether and a cresol novolak epoxy resin.

5. The method according to claim 1, wherein said inorganic filler is present in an amount of 30 to 50 vol % with respect to the total volume of the composition.

6. The method according to claim 1, wherein said composition further contains 1,4-diazabicyclo(5,4,0)undecene-7 as a hardening accelerator.

7. The method according to claim 1, wherein said alumina powder is α-type-alumina.

8. The method according to claim 7, wherein said epoxy resin is at least one resin selected from the group consisting of a glycidyl ether epoxy resin, a cyclic aliphatic epoxy resin, a glycidyl ester epoxy resin, a phenol novolak epoxy resin, a cresol novolak epoxy resin, tri(phenylglycidyl ether) methane, tetra(phenylglycidyl ether) methane, a brominated phenol novolak epoxy resin, a dicyclopentadiene novolak epoxy resin, and a naphthol novolak epoxy resin, said acid anhydride is at least one anhydride selected from the group consisting of phthalic anhydride, tetrahydrophthalic anhydride, hexahydrophthalic anhydride, methyltetrahydrophthalic anhydride, methylhexahydrophthalic anhydride, methylnadic anhydride, dodecylsuccinic anhydride, chlorendic anhydride, trialkyltetrahydrophthalic anhydride, glycerol tris(anhydrotrimellitate), ethylene glycolbisanhydrotrimellitate, and 5-(2,5-dioxotetrahydrofuryl)-3-methyl-3-cyclohexene-1,2-dicarboxylic anhydride, and each of said rubber particles having a thermoplastic resin skin consists of an acrylic rubber particle, as a core, and one member selected from the group consisting of an acrylic resin, a styrene resin, and an acrylic-styrene copolymer, as a skin.

9. The method according to claim 1, wherein said alumina powder is present in an amount of not more than 45 vol % with respect to the total amount of the whole composition.

10. The method according to claim 1, wherein said composition further contains 1,4-diazabicyclo(5,4,0) undecene-7 as a hardening accelerator.

11. The method according to claim 1, wherein each of said rubber particles having a thermoplastic resin skin consists of an acrylic rubber particle, as a core, and one member selected from the group consisting of an acrylic resin, a styrene resin, and an acrylic-styrene copolymer, as a skin.

* * * * *